United States Patent [19]

Otto

[11] 4,287,662

[45] Sep. 8, 1981

[54] METHOD OF ASSEMBLING

[75] Inventor: Charles W. Otto, DeKalb, Ill.

[73] Assignee: General Electric Company, Fort Wayne, Ind.

[21] Appl. No.: 73,139

[22] Filed: Sep. 6, 1979

Related U.S. Application Data

[62] Division of Ser. No. 889,962, Mar. 24, 1978, Pat. No. 4,198,584.

[51] Int. Cl.³ .............................................. H02K 15/14
[52] U.S. Cl. ....................................... 29/596; 310/88; 310/89
[58] Field of Search ...................... 29/596; 310/87–90; 308/187, 187.1, 36.1, 36.3, 125, 132

[56] References Cited

U.S. PATENT DOCUMENTS

| 1,992,818 | 2/1935 | Else | 308/187 |
| 3,832,021 | 8/1974 | Jennings et al. | 308/36.1 |
| 3,885,176 | 5/1975 | Cunningham | 310/90 X |

*Primary Examiner*—Carl E. Hall
*Attorney, Agent, or Firm*—Joseph E. Papin

[57] ABSTRACT

A method is provided for assembling a device in a preselected assembly position onto a rotatable shaft of a prime mover with respect to an opening in an end plate of the prime mover through which the shaft extends so as to preclude contamination of a lubricant in a lubrication system of the prime mover communicated with the opening in the event the prime mover is operated in an environment in which a fluid imcompatible with the lubricant may be presented to at least one of the end plate and an exterior end section of the shaft extending beyond the opening.

16 Claims, 4 Drawing Figures

METHOD OF ASSEMBLING

CROSS-REFERENCE TO RELATED APPLICATION

This application is a division of copending application Ser. No. 889,962 filed Mar. 24, 1978, now U.S. Pat. No. 4,198,584 which is incorporated herein by reference.

FIELD OF THE INVENTION

This invention relates generally to prime movers and in particular to a method of assembling components of a prime mover.

BACKGROUND OF THE INVENTION

In the past, various types of prime movers, such as dynamoelectric machines or electric motors, have been operated in an environment, such as that of an electric dishwasher for instance, for selectively driving a component thereof, such as a water pump or the like for instance of the dishwasher. Of course, such dishwashers have a cabinet or housing which rests on a floor or other support therefor, and in some of the past dishwashers, the water pump thereof was driven by a prime mover disposed in a space beneath the cabinet adjacent the floor. In one such installation, the prime mover was vertically disposed in the space beneath the dishwasher so that an upper end plate of the prime mover was secured to the dishwasher cabinet, and a rotatable drive shaft of the prime mover had an exterior end section extending beyond the upper end plate and through the cabinet into driving engagement with the water pump. Of course, suitable sealing means was provided between the cabinet and the exterior end section of the prime mover shaft extending therethrough; however, in the event that a seal problem developed for whatever reason, water leaked therepast and down the exterior end section of the prime mover shaft onto the upper end plate of the prime mover. In the above discussed past installations, one of the disadvantageous or undesirable features is believed to be that leakage water from the dishwasher may have dripped into the prime mover onto the electrical windings thereof which, of course, may have ultimately resulted in a winding short-circuiting situation. Another analogous disadvantageous or undesirable feature of such past installation is believed to be that such leakage water may have passed through the shaft opening in the upper end plate of the prime mover into the lubrication system thereof so as to contaminate the lubricant supplied to the lubricant supplied to the shaft to effect the lubrication thereof. Of course, since water is a fluid which is incompatible with the lubricant of the prime mover, it is believed that the aforementioned commingling thereof may have had deleterious effects on the shaft of the prime mover and the bearing arrangement therefor as well as the lubrication system itself.

SUMMARY OF THE INVENTION

Among the several objects of the present invention may be noted an improved method of assembling components of a prime mover which overcomes the disadvantageous or undesirable features discussed above, as well as others, which respect to the prior art; the provision of such improved method which precludes the deleterious commingling of a lubricant in a lubrication system of the prime mover by an incompatible fluid which may be leaked onto the prime mover in an environment in which the prime mover may be operated; the provision of such improved method in which an integral device is provided for precluding the passage through a shaft receiving opening in the end plate of the prime mover of a lubricant for the shaft and a fluid incompatible with the lubricant and to which the end plate may be subjected; and the provision of such improved method in which the component parts utilized therein are simplistic in design, economically manufactured and easily assembled. These as well as other objects and advantageous features of the invention will become in part apparent and in part pointed out hereinafter.

In general and in one form of the invention, a method is provided for assembling a device having a sleeve section integral with a pair of opposite annular slingers on a preselected assembly position onto a rotatable shaft of a prime mover. The device is assembled with respect to an end plate of the prime mover and an opening in the end plate through which the shaft extends so as to preclude contamination of a lubricant in a lubricating system of the prime mover communicated with the opening in the event the prime mover is operated in an environment in which a fluid incompatible with the lubricant may be presented to at least one of the end plates and an exterior end section on the shaft extending beyond the opening. In this method, the sleeve section of the device is arranged generally in gripping engagement about the exterior end section of the shaft, and the device is moved on the exterior end section toward the opening in the end plate. The sleeve section is inserted at least in part into the opening, and one of the slingers is located over the opening and with respect to a part of the end plate about the opening so as to define the preselected assembly position of the device and preclude the passage of any incompatible fluid across the end plate part into the opening and along the exterior end section of the shaft into the opening when the prime mover is operated in the environment of the fluid. The position of the other slinger is predetermined on the shaft with respect to the opening and the lubrication system so that the other slinger is disposed in lubricant slinging relation with respect to a part of the lubrication system when the one slinger is located with respect to the end plate part.

BRIEF DESCRIPTION OF THE DRAWINGS

Corresponding reference characters refer to corresponding parts throughout the several views of the drawings.

The exemplifications set out herein illustrate the preferred embodiments of the invention in one form thereof, and such exemplifications are not to be construed as limiting the scope of the disclosure or the scope of the invention in any manner.

DETAILED DESCRIPTION OF THE PREFERRED EMBODIMENTS

Figure 1:
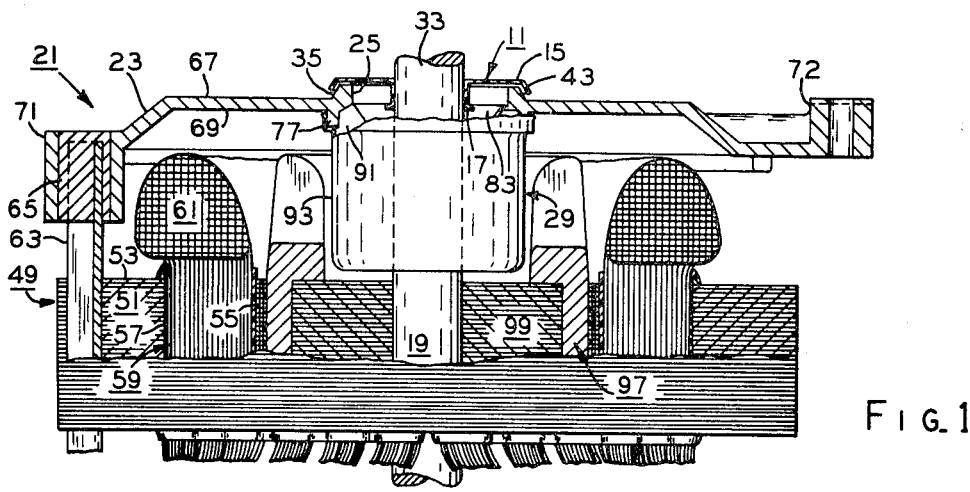
FIG. 1 is a partial sectional view showing a prime mover and illustrating principles which may be practiced in a method of assembling a device to a shaft of the prime mover in one form of the invention.
Figure 2:
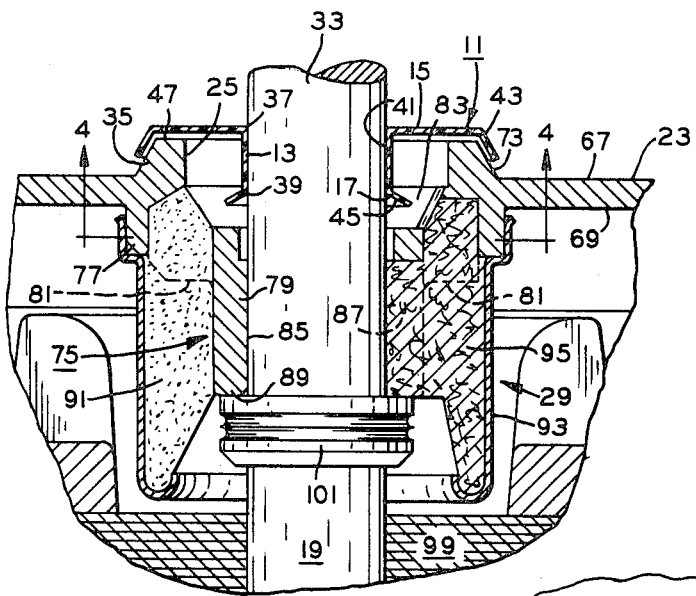
FIG. 2 is an enlarged fragmentary sectional view taken from FIG. 1.

Referring now to the drawings in general, there is illustrated in one form of the invention a method of assembling a device 11 having a sleeve section 13 with a pair of opposite flange means or flanges, such as slingers 15, 17, in a preselected assembly position onto a rotatable shaft 19 of a prime mover 21 (FIGS. 1-4). Device 11 is assembled with respect to an end plate 23 of prime mover 21 and an opening 25 in the end plate through which shaft 19 extends so as to preclude contamination of a lubricant in a lubricating system 29 of the prime mover communicated with the opening (FIG. 2). Device 11 is operative in the event prime mover 21 is operated in an environment, such as that of an electric dishwasher for instance (not shown), in which a fluid, such as water (not shown) for instance, incompatible with the lubricant may be presented to at least one of end plate 23 and an exterior end section 33 on shaft 19 extending beyond opening 25 (FIG. 1). In this method, sleeve section 13 of device 11 is arranged or otherwise positioned in gripping engagement about exterior end section 33 of shaft 19, and the device is moved or slid on the exterior end section toward opening 25 in end plate 23. Sleeve section 13 is inserted at least in part into opening 25, and one of the flanges 15 is located over the opening with respect to a part, such as a generally annular hub or dam 35, of end plate 23 about the opening so as to define the preselected assembly position of device 11 and preclude the passage of any incompatible fluid across the dam into the opening and/or along exterior end section 33 of shaft 19 into the opening when prime mover 21 is operated in the environment of the fluid. The position of the other flange 17 on shaft 19 is predetermined with respect to opening 25 and lubrication system 29 so that flange 17 is disposed in lubricant slinging or throwing relation with respect to a part of the lubrication system when flange 15 is located, as discussed above, with respect to dam 35 (FIGS. 1-4).

Figure 3:
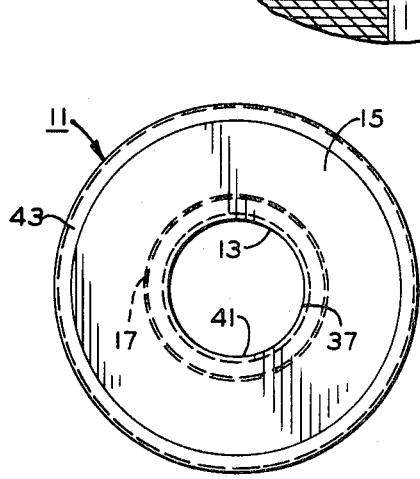
FIG. 3 is a plan view of the device of FIGS. 1 and 2.
Figure 4:
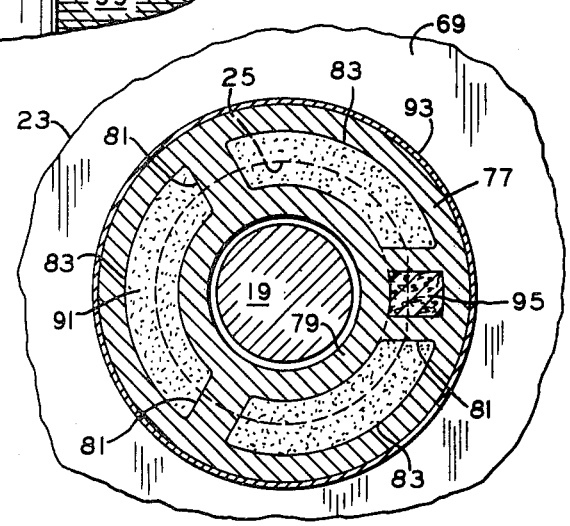
FIG. 4 is a sectional view taken along line 4—4 in FIG. 1.

More particularly and with specific reference to FIGS. 2 and 3, device 11 is illustrated for purposes of disclosure as being formed of a resin or plastic material, and sleeve section 13 and flanges 15, 17 are integrally formed with each other by a suitable manufacturing process, such as injection molding for instance; however it is contemplated that the device may be formed from different materials and that at least one of the flanges may be integrally connected or otherwise attached with the sleeve section within the scope of the invention so as to meet the objects thereof. Sleeve or sleeve section 13 is generally cylindric having a pair of opposite end or end portions 37, 39, and a bore 41 is provided axially through the sleeve section intersecting with the opposite ends thereof. Flanges 15, 17 are generally annular in shape and integrally formed with opposite ends 37, 39 of sleeve section 13 so as to extend generally radially therefrom, and the flanges are predeterminately spaced generally axially from each other. Flange 15 includes a lip 43 integrally formed with the outer peripheral portion of the flange, and the lip depends from the flange at a predetermined angle. Flange 17 is arranged generally at an obtuse angle with respect to sleeve section 13, and a generally annular surface 45 is provided on the flange about bore 41 of the sleeve section so as to intersect therewith.

Bore 41 of sleeve section 13 is predeterminately sized so as to be grippingly engaged about exterior end section 33 of shaft 19 when device 11 is arranged thereon and yet be slidable on the exterior end section in response to an applied or positioning force to the preselected assembly position of the device (as best seen in FIG. 2). The force for effecting the movement of device 11 to its preselected assembly position on shaft 19 may be exerted thereon manually or preferably by suitable locating tooling and equipment (not shown); however, for the sake of brevity, a description of such locating tooling and equipment and its operation is omitted. As device 11 is moved toward the preselected assembly position thereof on shaft 19, it may be noted that flange 15 of the device is predeterminately located or spaced with respect to a generally annular or upper surface 47 on dam 35 of end plate 23 and so as to extend over opening 25. Thus, any fluid which may leak or flow from the dishwasher (not shown) generally downwardly on exterior end section 33 of shaft 19 is interrupted by flange 15 extending over end plate opening 25 thereby to prevent the passage of such leakage flow of the fluid into the opening. Of course, this leakage flow of fluid on shaft 19 may be re-directed by flange 15 generally radially outwardly of the shaft toward end plate 23 without the confines of dam 35 about opening 25, and it is contemplated that such redirected leakage flow of fluid may eventually drip harmlessly from the outer peripheral edges of the end plate without any deleterious affect on prime mover 21. When prime mover 21 is energized, the conjoint rotation of device 11 with shaft 19 of the prime mover will be effective to sling or throw any of the leakage fluid which may be associated with flange 15 generally radially outwardly thereof away from opening 25 in end plate 23.

Upon the location of flange 15 when device 11 is moved into the preselected position thereof on shaft 19, as discussed above, it may be noted that the location or position of flange 15 is predetermined with respect to opening 25 in end plate 23 as well as at least a part of lubrication system 29 which is communicated with the opening and associated with the end plate. In other words, the predetermined location of flange 15 disposes it generally in lubricant slinging or throwing relation with lubrication system 29 and also in position to interrupt lubricant flow along shaft 19. Thus, when prime mover 21 is energized, the conjoint rotation of device 11 with shaft 19 of the prime mover will be effective to clause flange 17 to interrupt any flow theretoward of lubricant generally along the shaft, and the rotation of the flange will throw such interrupted lubricant generally radially outwardly so that it may be recaptured by lubrication system 29.

In view of the foregoing, it may be seen that device 11 is an important aspect of the invention being disposed in the preselected position thereof about shaft 19 so that flange 15 of the device is predeterminately located with running clearance with respect to end plate 23 and over opening 25 and so that flange 15 of the device is predeterminately located with respect to the opening and lubrication system 29 in the lubricant slinging relation therewith. Thus, with device 11 so located in its preselected assembly position, it may be noted that the device not only prevents egressing flow of lubricant through opening 25 but also prevents ingressing flow therethrough of fluid which, of course, if commingled or mixed with the lubricant would cause deleterious contamination thereof.

Referring again in general to the drawings and recapitulating at least in part with respect to the foregoing, prime mover 21 has rotatable shaft 19 with exterior end section 33 thereof adapted for driving association with an apparatus, such as the aforementioned dishwasher (not shown) for instance, and for subjection to the leakage flow from the apparatus of fluid which, as previously mentioned, is incompatible with the lubricant of lubrication system 29 operable generally in the prime mover to effect lubrication of the shaft (FIGS. 1 and 2). End plate 23 is provided with opening 25 therethrough in radially spaced relation with shaft 19 and communicating with lubrication system 29, and means, such as device 11, is provided for preventing the passage of the fluid and the lubricant through the opening (FIG. 2). Passage preventing means or device 11 includes means, such as sleeve section 13, disposed at least in part within opening 25 and arranged about shaft 19 for conjoint rotation therewith, and means, such as flange 17, is integral with the conjoint rotation means or sleeve section 13 for interrupting any flow of the lubricant on shaft 19 and generally therealong toward the opening 20 and for returning the interrupted lubricant to lubrication system 29. Device 11 further includes means, such as flange 15, on sleeve section 13 for interrupting fluid in the event of any leakage thereof generally along exterior end section 33 of shaft 19 toward opening 25 and for displacing the interrupted fluid away from the opening (FIGS. 1-4).

More particularly and with specific reference to FIGS. 1 and 2, a stationary assembly 49 of prime mover 21 comprises a ferromagnetic stator 51 which may be formed of a plurality of stacked laminations for instance, as shown for purposes of disclosure, or which may be of the powdered iron or sintered metal type. Stator 51 is provided with an end or end face 53 having a bore 55 intersecting therewith, and the bore is also intersected by a plurality of winding slots 57 in which stator windings or winding means 59 are positioned with suitable insulation therebetween. Stator winding 59 extends axially from slots 57 and is formed into a generally annular grouping of end turns 61 adjacent stator end face 53, and the stator windings may comprise a pair of opposite pole main or run windings and a pair of opposite pole auxiliary or start windings electrically displaced from each other; however, it is contemplated that other stator windings having various different configurations, interconnections and phase relationships may be utilized within the scope of the invention. A plurality of structural members or beams 63 are carried by or otherwise fixedly connected to stator 51 adjacent the outer peripheral portion thereof, and the ends of the beams are fixedly connected by suitable means, such as plugs 65 of a hardenable material for instance, to end plate 23. If a more detailed discussion of the arrangement of beams 63 with stator 51 and with end plate 23 is desired, reference may be had to U.S. Pat. No. 3,858,067 issued to Charles W. Otto on Dec. 31, 1974 and to U.S. Pat. No. 3,867,654 issued to Charles W. Otto on Feb. 18, 1974, and each of these patents is specifically incorporated herein by reference.

End Plate 23 may be formed of a non-magnetic material, such as aluminum or an alloy thereof for instance, but it is contemplated that other end plates having different configurations and formed of different materials, such as ferrous or resin materials for instance, may be utilized in prime mover 21 within the scope of the invention so as to meet the objects thereof. End plate 23 is provided with an exterior or upper face 67 and another opposite or interior face 69 interconnecting with a peripheral section or outer portion 71 to which beams 63 are secured, as previously mentioned. A plurality of means, such as arms 72, for mounting prime mover 21 to apparatus (not shown) driven thereby may, if desired, be integrally provided on end plate 23; therefore, in the event the prime mover is operated in the environment of the aforementioned electric dishwasher for instance, mounting means or arms 72 may be secured by suitable means directly to the cabinet or housing of the electric dishwasher with exterior end section 33 of shaft 19 extending through a suitable sealing means (not shown) provided therefor in the cabinet.

Dam 35 is integrally provided on exterior face 67 of end plate 23 about or in circumscribing relation with opening 25 which extends generally coaxially through the dam and between opposite faces 67, 69 of the end plate. Dam 35 includes generally annular surface 47 which, as previously mentioned, is predeterminately spaced above or axially beyond exterior end face 67 of end plate 23 and another surface 73, which extends generally annularly and in an axial direction, is interposed between surface 47 and the exterior face of the end plate so as to be disposed closely adjacent lip 43 of flange 15. If desired, at least one groove or viaduct or the like (not shown) may be provided in exterior face 67 of end plate 23 extending outwardly away from dam 35 to enhance drainage of any fluid which may be present on the end plate.

As illustrated for purposes of disclosure, a unitary bearing assembly 75 includes a generally annular base hub 77 integrally formed on interior face 69 of end plate 23 and extending axially therefrom generally coaxially with respect to end plate opening 25, and a generally cylindric bearing hub 79 is supported on the base hub by a plurality of radially disposed axially extending support arms 81 integrally formed therebetween. A plurality of generally arcuate apertures 83 are provided in base hub 77 between support arms 81 and intersecting with end plate opening 25, and a generally cylindric bearing means, such as a bearing surface 85 for instance, is axially provided through bearing hub 79 so as to be generally coaxially aligned with the end plate opening. A wick receiving window or slot 87 is provided radially through bearing hub 79 and intersects with bearing means 85 so as to extend axially thereof for generally the entire axial length of the bearing surface, and if desired, a free end surface 89 on the bearing hub may be utilized as a thrust bearing surface, as discussed hereinafter. While bearing assembly 75 is illustrated herein for purposes of disclosure, as previously mentioned, it is contemplated that other bearing assemblies may be associated with end plate 23 and shaft 19 within the scope of the invention so as to meet the objects and advantageous features set out herein with respect to such invention.

Lubrication system 29 includes means, such as a lubricant storage wicking material 91 or the like, for containing the aforementioned lubricant and releasing it at a rate effective to provide adequate or desired lubrication in prime mover 21. Lubricant storage wicking material or containing and releasing means 91 may be "G.E. Lube" manufactured by General Electric Company, Fort Wayne, Ind.; however, it is contemplated that other storage wicking material may be employed in prime mover 21 within the scope of the invention so as to meet the objects thereof. If a more detailed discussion of the composition of lubricant storage wicking material 91 or the use thereof in a lubrication system is desired, reference may be had to U.S. Pat. No. 3,894,956 issued July 15, 1975 to James A. Whitt which is specifically incorporated herein by reference. A generally annular container or open ended cup-shaped member, such as a sleeve 93 or the like, has one end thereof secured by suitable means, such as crimping or swedging for instance, about base hub 77 adjacent interior face 69 to end plate 23, and container 93 extends generally coaxially about bearing hub 79 so that the opposite or free end of the container is disposed axially beyond free end surface 89 of the bearing hub. Storage wicking material 91 may be manually packed or automatically injected by suitable means known to the art into its preselected configuration (as best seen in FIG. 2) between container 93 therefor and bearing hub 79, and it may be noted that the storage wicking material is located within arcuate apertures or windows 83 disposed adjacent opening 25 in end plate 23. Thus, storage wicking material 91 located within arcuate apertures 83 is disposed in the lubricant slinging relation with flange 17 of device 11 so as to capture lubricant 27 thrown therefrom. A feeder wick 95 of any suitable composition or material, such as a felt for instance, may be located within window 87 of bearing hub 79 in lubricant feeding or transfer relation between shaft 19 and storage wicking material 91.

Prime mover 21 is also provided with a rotatable assembly 97 including a ferromagnetic rotor 99 mounted to or disposed about shaft 19 in a manner known to the art. Rotor 99 is arranged coaxially within stator bore 55 so as to be disposed in magnetic coupling relation with stator 51 upon energization of prime mover 21. Shaft 19 extends from rotor 99 through opening 25 in end plate 23 and is rotatably journaled in bearing means 85 of bearing hub 79 in the lubricant transfer relation or engagement with feeder wick 95 of lubrication system 29 arranged in bearing hub window 87. A thrust bearing 101 is located on shaft 19 for thrust bearing engagement with thrust surface or free end 89 of bearing hub 79, and the thrust bearing may be lubricated by an end of feeder wick 95 disposed in hub window 87 which intersects the thrust surface of the bearing hub.

In the operation, assume that prime mover 21 is drivingly associated with the aforementioned electric dishwasher (not shown) as previously suggested. When prime mover 21 is energized, winding means 59 thereof are excited, and since rotor 99 is disposed in magnetic coupling relation with stator 51, such energization of the prime mover effects conjoint rotation of the rotor and shaft 19. As well known in the art, this rotation of shaft 19 in bearing assembly 75 effects a flow of lubricant from storage wicking means 91 through feeder wick 95 into lubricant transfer relation with rotating shaft 19 thereby to provide a desired film of lubricant between the shaft and bearing means 85 in which the shaft is journaled. At least a part of the lubricant so transferred to the shaft may flow generally therealong without bearing means 85 toward opening 25 in end plate 23. However, in order to prevent lubricant loss or displacement of lubricant from prime mover 21 through opening 25, flange 17 of device 11 interrupts this flow of lubricant along shaft 19 toward end plate opening 25. In response to the conjoint rotation with shaft 19 of flange 17, the flange is operative to throw or sling such interrupted lubricant generally radially outwardly therefrom toward storage wicking material 91 disposed within arcuate apertures 83 of bearing assembly 75 for recapture by the storage wicking material. Of course, some of this lubricant thrown by flange 17 of device 11 may drain or flow downwardly (as best seen in FIG. 1) and back into the body of storage wicking material 91. Thus, as previously noted, the predetermined position of flange 17 on shaft 19 with respect to end plate opening 25 and lubrication system 29 places the flange in the lubricant transfer or throwing relation with the lubrication system, as discussed above.

In the event a leakage flow of water from the dishwasher onto exterior end section 33 of shaft 19 reaches flange 15 of device 11 during the energization of prime mover 21, the flange will, of course, preclude the entry of such leakage water into end plate opening 25. In other words, flange 15 will not only interrupt this flow of leakage water toward end plate opening 25 but, in response to the conjoint rotation of device 1 and the flange with shaft 19, the flange will sling or throw such leakage water radially outwardly thereof away from the shaft and the end plate opening. Of course, if any of this leakage flow of water collects or is present on end plate 23, dam 35 obviates flow of such leakage water thereacross into end plate opening 25. Eventually, it is contemplated that any leakage water on end plate 23 will flow toward peripheral section 71 of the end plate and drip harmlessly therefrom. Even in the static or at-rest position of device 11 when prime mover 21 is deenergized, flange 15 is effective to interrupt the flow of leakage water downwardly on exterior end section 33 of shaft 19 and redirect such leakage water flow generally radially outwardly over lip 43 of the flange onto end plate 23, and as previously noted, dam 35 prevents the entry of such redirected leakage water from the end plate into opening 25 thereof.

Thus, either during energization or deenergization of prime mover 21, device 11 in its preselected assembly position and in cooperation with dam 35 precludes ingress of leakage water into end plate opening 25 thereby to obviate the undesirable commingling of such leakage water with the lubricant in lubrication system 29 which would, of course, cause deleterious contamination thereof. Further and as previously mentioned, flange 17 of device 11 in its preselected assembly position not only precludes egressing flow of lubricant through end plate opening 25 but is also operative to effect the return of such lubricant to the lubrication system.

From the foregoing, it is now apparent that a novel method of assembling components of a prime mover is presented meeting the objects set out hereinbefore, as well as others, and that changes as to the precise configuration, shapes, details and connections of such components, as well as the precise steps of the method, may be made by those having ordinary skill in the art without departing from the spirit of the invention or the scope of the claims therefor, as set forth hereinafter.

What I claim as new and desire to secure by Letters Patent of the United States:

1. A method of assembling a device having a sleeve section integral with a pair of opposite annular slingers in a preselected assembly position onto a rotatable shaft of a prime mover and with respect to an end plate of the prime mover and an opening in the end plate through which the shaft extends so as to preclude contamination of a lubricant in a lubricating system of the prime mover communicated with the opening in the event the prime mover is operated in an environment in which a fluid incompatible with the lubricant may be presented to at least one of the end plate and an exterior end section on the shaft extending beyond the opening, the method comprising the steps of:
- (a) arranging the sleeve section of the device generally in gripping engagement about the exterior end section of the shaft and moving the device on the exterior section toward the opening in the end plate;
- (b) inserting the sleeve section at least in part into the opening and locating one of the slingers over the opening and with respect to a raised part of the end plate disposed about the opening so as to define the preselected assembly position of the device and preclude the passage of any incompatible fluid across the end plate part into the opening and along the exterior end section of the shaft into the opening when the prime mover is operated in the environment of the fluid; and
- (c) predetermining the position of the other slinger on the shaft with respect to the opening and the lubrication system so that the other slinger is disposed in lubricant slinging relation with respect to a part of the lubrication system when the one slinger is located with respect to the raised part of the end plate during the inserting and locating step.

2. In a method of assembling a prime mover including a rotatable shaft with an end section thereof adapted for driving an apparatus and for subjection to leakage flow in the event of the occurence thereof from the apparatus of a fluid incompatible with a lubricant of a lubrication system in the prime mover to effect the lubrication of the shaft, at least one end plate with an opening therein extending about the shaft and communicated with the lubrication system, and means for preventing passage of the lubricant and the fluid through the opening, the method comprising the steps of:

associating the passage preventing means about the end section of the shaft;

moving the passage preventing means along the end section of the shaft toward the at least one end plate; and disposing the passage preventing means in an assembly position with respect to the shaft and the at least one end plate so that a part of the passage preventing means is arranged with respect to the opening for interrupting lubricant flow upon the occurence thereof generally along the shaft toward the opening and also so that another part of the passage preventing means is arranged with respect to the opening for interrupting leakage fluid flow in the event of the occurence thereof generally along the end section of the shaft toward the opening.

3. The method as set forth in claim 2 comprising the preliminary step of providing a raised extension means on the at least one end plate about the opening for interrupting leakage fluid flow on the at least one end plate toward the opening in the event of the collection of the leakage fluid on the at least one end plate.

4. The method as set forth in claim 3 wherein the disposing step includes arranging the another part of the passage preventing means so as to extend in spaced relation generally about at least a part of the extension means.

5. The method as set forth in claim 2 wherein the disposing step includes locating the another part of the passage preventing means in its assembly position on the shaft with respect to a part of the at least one end plate so as to predetermine the position of the first named part of the passage preventing means with respect to the opening and the lubrication system.

6. The method as set forth in claim 2 comprising the additional step of rotating the passage preventing means conjointly with the shaft when the prime mover is energized so that the another part of the passage preventing means displaces any interrupted leakage fluid away from the opening.

7. The method as set forth in claim 2 comprising the additional step of rotating the passage preventing means conjointly with the shaft when the prime mover is energized so that the first named part of the passage preventing means effects the return of any interrupted lubricant from the shaft to the lubrication system.

8. The method as set forth in claim 2 wherein the passage preventing means has a sleeve section integral with the first named part and the another part of the passage preventing means and wherein the associating step includes engaging the sleeve section in gripping relation about the end section of the shaft.

9. The method as set forth in claim 8 wherein the passage preventing means is formed of a resin material, and the first named and another part of the passage preventing means comprise a pair of generally annular spaced apart flanges integral with the sleeve section, respectively.

10. A method of assembling a device onto a rotatable shaft of a prime mover having an end plate with an opening therein through which an end section of the shaft extends exteriorly of the prime mover so as to preclude contamination of a lubricant in a lubrication system of the prime mover in the event the prime mover is operated in an environment in which a fluid incompatible with the lubricant may be presented to at least one of the end section of the shaft and the end plate, the method comprising the steps of:

engaging the device in gripping relation about the end section of the shaft;

sliding the device on the end section of the shaft and in the gripping engagement relation therewith toward the opening in the end plate;

inserting the device in part into the opening in the end plate; and arranging the device in a preselected assembly position on the shaft with one of a pair of flanges integral with the device extending adjacent the end plate over the opening so as to preclude the passage of any incompatible fluid both along the end plate and the end section of the shaft into the opening when the prime mover is operated in the environment of the incompatible fluid and with the other of the flanges disposed with respect to the opening and the lubrication system so as to preclude the passage through the opening of lubricant flowing from the lubrication system along the shaft toward the opening when the prime mover is operated.

11. The method as set forth in claim 10 comprising the preliminary step of providing a raised section on the end plate about the opening.

12. The method as set forth in claim 11 wherein the arranging step includes disposing a part of the one flange so as to extend about the raised section of the end plate generally in close spaced relation therewith.

13. The method as set forth in claim 10 wherein the arranging step includes locating the one flange of the device in its assembly position on the shaft with respect to a part of the end plate so as to predetermine the position of the other flange with respect to the opening and the lubrication system.

14. The method as set forth in claim 10 comprising the additional step rotating the device conjointly with the shaft when the prime mover is operated so that the one and other flanges sling the incompatible fluid and the lubricant away from the opening, respectively, and with the lubricant being returned to the lubrication system.

15. The method as set forth in claim 10 wherein the device has a sleeve integrally formed with the one and other flanges and wherein the engaging step includes positioning the sleeve about the end section of the shaft in the gripping engagement relation therewith.

16. The method as set forth in claim 10 comprising the preliminary step of forming the device integrally of a resin material.

* * * * *